US008089983B2

(12) United States Patent
Asati et al.

(10) Patent No.: US 8,089,983 B2
(45) Date of Patent: Jan. 3, 2012

(54) RESERVING RESOURCES OVER A DOCSIS DOWNSTREAM EXTERNAL PHYSICAL INTERFACE

(75) Inventors: Rajiv Asati, Research Triangle Park, NC (US); John Chapman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 400 days.

(21) Appl. No.: 12/351,671

(22) Filed: Jan. 9, 2009

(65) Prior Publication Data

US 2010/0177784 A1   Jul. 15, 2010

(51) Int. Cl.
*H04L 12/66* (2006.01)
(52) U.S. Cl. .................. 370/463; 370/395.21; 370/230; 370/401
(58) Field of Classification Search .............. 370/230, 370/392, 395.52, 395.53, 486, 220, 401, 370/467, 351, 389, 395.1, 395.2, 395.21, 370/463; 725/111, 109, 95, 117, 118
See application file for complete search history.

(56) References Cited

U.S. PATENT DOCUMENTS

| | | | | |
|---|---|---|---|---|
| 7,539,208 B2 * | 5/2009 | Chapman et al. | ............. | 370/466 |
| 7,630,361 B2 * | 12/2009 | Chapman et al. | ............. | 370/352 |
| 7,701,951 B2 * | 4/2010 | Chapman et al. | ........ | 370/395.52 |

OTHER PUBLICATIONS

RFC 4420 Encoding of Attributes for Multiprotocol Label Switching (MPLS) Label Switched Path (LSP) Establishment Using Resource ReserVation Protocol-Traffic Engineering (RSVP-TE).*
Asati, Rajiv, U.S. Appl. No. 12/326,599, Dynamic EQAM Discovery in M-CMTS Architecture, filed Dec. 2, 2008.
Asati, Rajiv, U.S. Appl. No. 11/776,200, Transferring DOCSIS Frames Using a Label Switching Network, filed Nov. 28, 2007.
A. Farrel, Ed., RFC 4420: Encoding of Attributes for Multiprotocol Label Switching (MPLS) Label Switched Path (LSP) Establishment Using Resource ReserVation Protocol-Traffic Engineering (RSVP-TE), Network Working Group, Feb. 2006.

* cited by examiner

*Primary Examiner* — Chi Pham
*Assistant Examiner* — Weibin Huang
(74) *Attorney, Agent, or Firm* — Stolowitz Ford Cowger LLP

(57) ABSTRACT

In one example, a resource reservation protocol is modified to allow a Modular Cable Modem Termination System (M-CMTS) core to use the protocol to reserve, for a flow, network resources as well as a Radio Frequency (RF) channel extending from the remote PHYsical interface (PHY). The modifications allow the M-CMTS core to identify parameters to be used by the edge device for selecting an available RF channel to be reserved for the flow, or to request a particular one of the RF channels. Intermediary devices operating on the DEPI can also reserve resources for the flow without being reconfigured according to the protocol modifications.

20 Claims, 4 Drawing Sheets

US 8,089,983 B2

RESERVING RESOURCES OVER A DOCSIS DOWNSTREAM EXTERNAL PHYSICAL INTERFACE

TECHNICAL FIELD

The present disclosure relates generally to the field of networking.

BACKGROUND

Cable operators have widely deployed high-speed data services on cable television systems. These data services allow subscriber-side devices, such as personal computers, to communicate over an ordinary cable TV network through a cable modem. The cable modem communicates with a Cable Modem Termination System (CMTS), which connects the cable TV network to a data network, such as the Internet.

Modular CMTSs (M-CMTSs) have been developed to improve scaling and for other reasons. These modular systems typically include an M-CMTS core device implementing a subset of Data Over Cable Service Interface Specification (DOCSIS) protocols (such as Media Access Control (MAC) layer, etc.) and one or more remote PHYs such as an Edge Quadrature Amplitude Modulation (EQAM) implementing the remaining DOCSIS protocols (such as the PHYsical layer (PHY), etc.) These EQAMs generally include modulation devices for modulating downstream traffic to the cable modems or demodulation devices for demodulating upstream traffic from the cable modems. The M-CMTS core and the EQAMs use a Downstream External Physical Interface (DEPI) and Upstream External Physical Interface (UEPI) to transport downstream user data and upstream user data respectively.

These M-CMTS cores and EQAMs generally communicate with each other over an Internet Protocol/Multi-Protocol Label Switching (IP/MPLS) network to establish the DEPI and the UEPI tunnels. It is desirable to provide the M-CMTS core with some control over the network resources used by the DEPI while reserving EQAM resources. The disclosure that follows enables such a control and solves other problems.

DESCRIPTION OF EXAMPLE EMBODIMENTS

Overview

In one example, a resource reservation protocol is modified to allow a Modular Cable Modem Termination System (M-CMTS) core to use the protocol to reserve, for a flow, network resources as well as a Radio Frequency (RF) channel extending from the remote PHYsical interface (PHY). The modifications allow the M-CMTS core to identify parameters to be used by the edge device for selecting an available RF channel to be reserved for the flow, or to request a particular one of the RF channels. Intermediary devices operating on the DEPI can also reserve resources for the flow without being reconfigured according to the protocol modifications.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
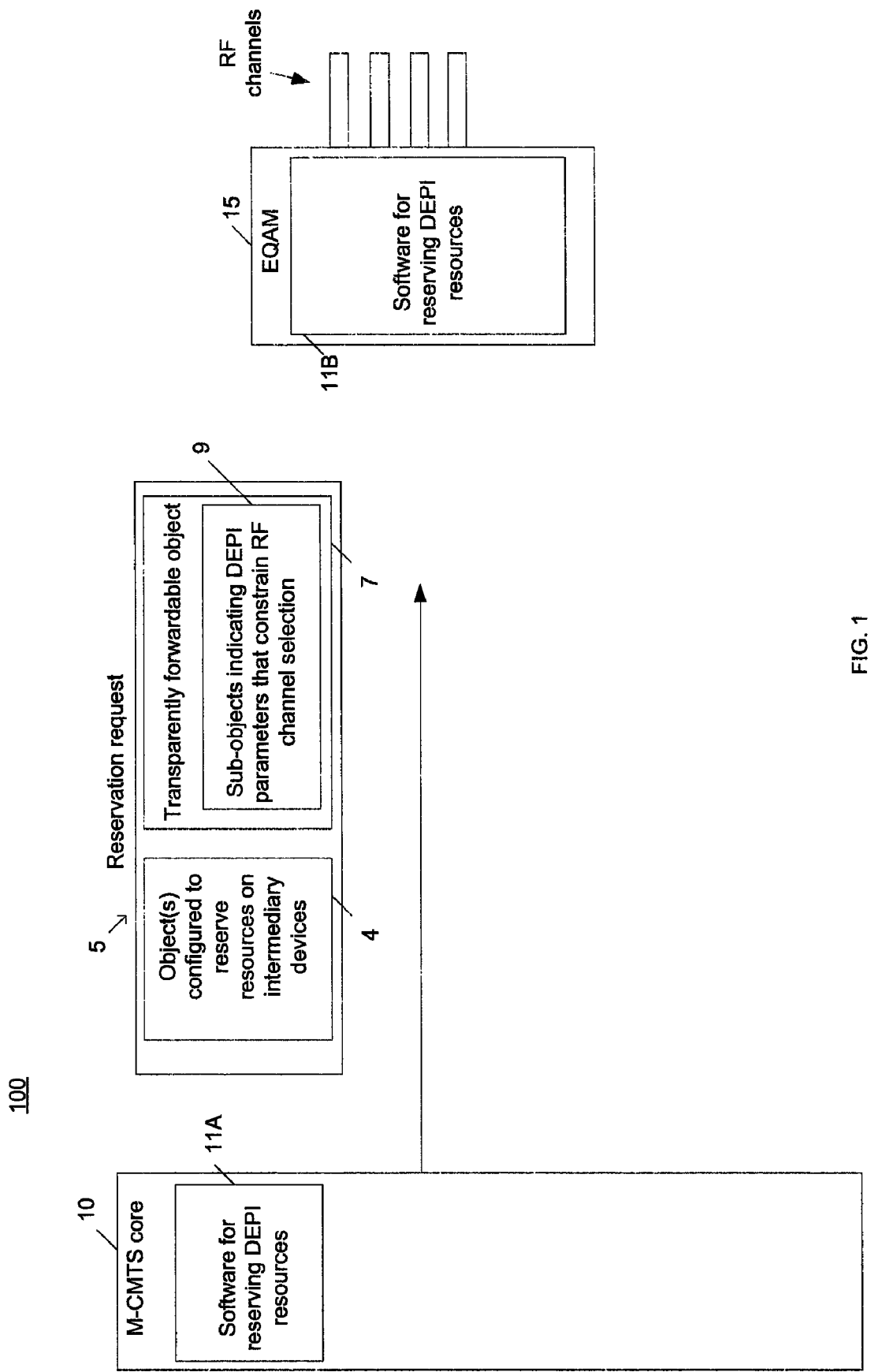
FIG. 1 illustrates a Modular Cable Modem Termination System (M-CMTS) capable of reserving Downstream External Physical Interface (DEPI) resources.

FIG. 1 illustrates a Modular Cable Modem Termination System (M-CMTS) capable of reserving Downstream External Physical Interface (DEPI) resources.

The example M-CMTS 100 includes an M-CMTS core 10 and an EQAM 15 configured with software 11A and 11B, respectively. The M-CMTS 100 can reserve for a flow both of 1) network resources available on the core and edge devices as well as intermediary devices connecting them, and 2) EQAM resources such as one of the Radio Frequency (RF) channels, and because of how the software 11A and 11B operate, such reservation can be provided without modifying any intermediary devices that are already configured for interoperability with the Resource Reservation Protocol (RSVP).

As will be explained in a more detailed example later with reference to FIG. 2, the software 11A generates a reservation request 5 according to a reservation protocol that is enabled on the M-CMTS core 10, the EQAM 15, and intermediary devices connecting them. The software 11A generates request 5 with objects 4 and 7, which can be distinguished from each other as explained in the next paragraph.

The object(s) 4 are configured to be processed by the intermediary device 5 according to the reservation protocol, which allows resources to be reserved for the flow from the CMTS core 10 up to the EQAM 15. The transparently forwardable object 7 is a field or other object designated under the reservation protocol as being transparently forwardable. The object 7 contains sub-objects 9 indicating DEPI parameters to be used by the software 11B to reserve EQAM resources including one or more of the RF channels. Because the sub-objects 9 are placed in the field 7, the intermediary devices will transparently forward the requests without stripping away the sub-objects 9 and/or rejecting the requests.

The software 11B processes the sub-objects 9 to identify ones of the RF channels that meet the flow requirements as indicated by the sub-objects 9. The software 11B then reserves resources on either the identified or an available one(s) of the eligible RF channels.

As a result, the M-CMTS 100 can establish a unidirectional tunnel using the reserved resources. The reserved resources include those on the packet switched segment of the communication path (from the M-CMTS core 10 to the EQAM 15, including an outgoing IP interface of the M-CMTS core as well as an incoming IP interface of the EQAM), as well as an RF channel on the Hybrid Fiber Coax (HFC) segment of the network (by reserving an outgoing QAM channel interface of the EQAM). The technique leverages a known protocol and extends it in such a way that a QAM channel can be reserved on the EQAM 15, and the extensions are backwards compatible with the intermediary devices.

Having described the FIG. 1, a detailed example will now be described with reference to FIG. 2. The detailed example described with reference to FIG. 2 utilizes RSVP, all though it should be understood that other examples can utilize other reservation protocols while still utilizing the principles described herein.

Figure 2:
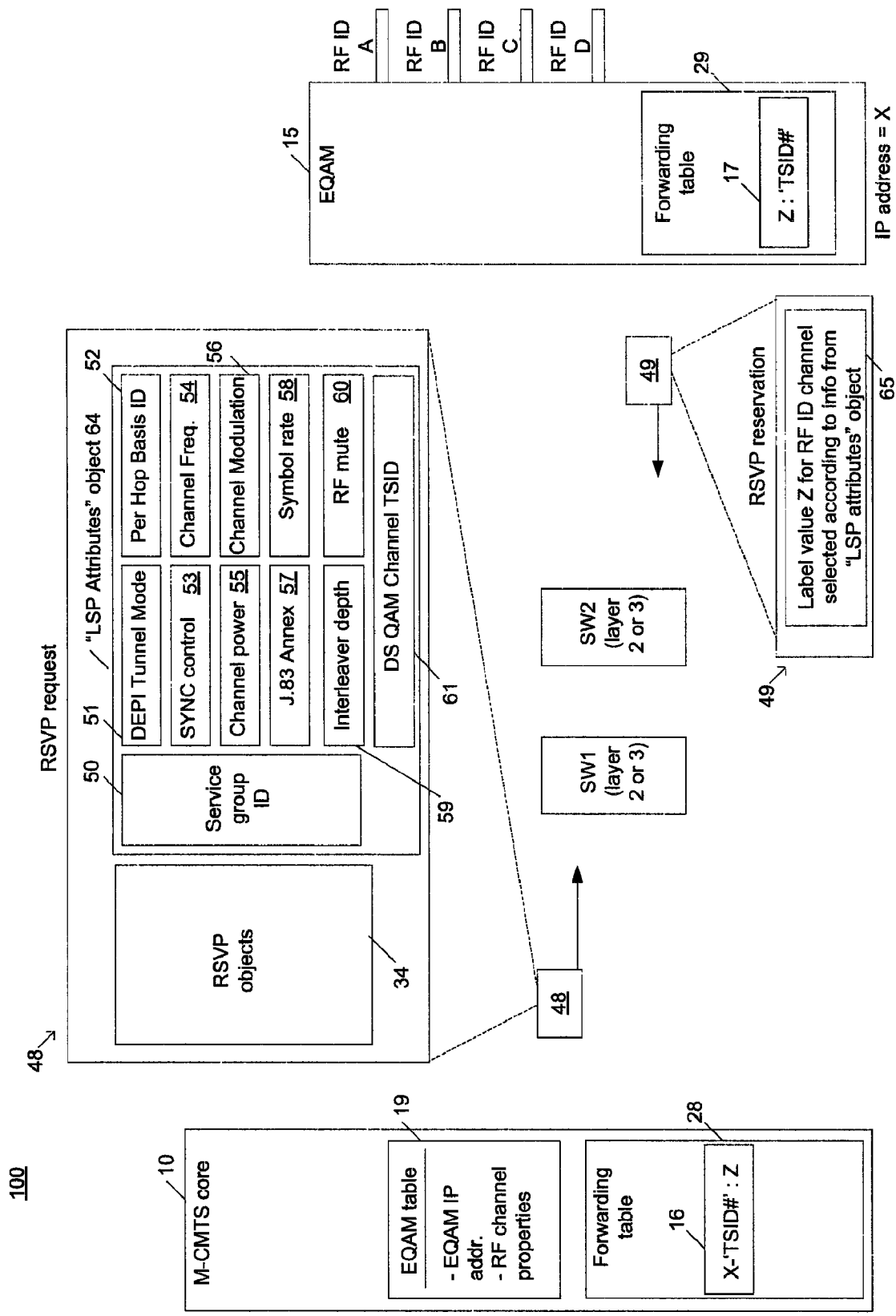
FIG. 2 illustrates one example of how the M-CMTS shown in FIG. 1 can reserve the DEPI resources.

FIG. 2 illustrates one example of how the M-CMTS shown in FIG. 1 can reserve the DEPI resources.

After the M-CMTS core 10 receives an indication that resources are to be reserved for a flow, the M-CMTS core 10 identifies a destination for the flow by comparing destination information with an internal table. The destination indicates one or more EQAMs 15 to be used in path computation.

The M-CMTS core 10 then computes a path over the network to the identified EQAM 15. The factors utilized in the computation include parameters from the EQAM table 19 in addition to those factors typically used in RSVP path computation, e.g. bandwidth and L2/L3 network topology. The EQAM table 19 includes information such as the IP address X of each EQAM 15 and DEPI/QAM parameters such as the number of QAM channels, DEPI mode of each QAM channel, and the Service-Group IDs. These DEPI/QAM parameters will be given more description later when describing sub-objects 50-61. The DEPI/QAM parameters from the EQAM table 19 are used to identify EQAM resources that are eligible for being reserved for the flow (whether a reservation is granted for these identified eligible resources is determined later by the EQAM 15). The DEPI/QAM parameter values used in path computation can be input using a same mechanism used to input the request for resource reservation.

In the present example, the EQAM table 19 is maintained at least in part using the technique described in U.S. patent application Ser. No. 12/326,599 entitled "Dynamic EQAM Discovery in M-CMTS Architecture", which is herein incorporated by reference in its entirety. In such an example, the EQAM table 19 is maintained according to modulated channel descriptors extracted from link state routing messages flooded over a domain of the DEPI. However, it should be apparent that the EQAM table 19 can be maintained using other techniques.

The M-CMTS core 10 then generates the RSVP request (PATH message) 48 according to the path computation and is sent to the first intermediate device as identified by the path computation. The RSVP request includes a (Label Switched Path) LSP Attributes object 64 containing a plurality of Type Length Value fields 50-61 (described in detail in subsequent paragraphs) containing DOCSIS information to be used by the EQAM 15 in selecting an RF channel to be reserved for the flow. The Internet Engineering Task Force (IETF) Request For Comment (RFC) 4420 describes an LSP Attribute object and is herein incorporated by reference in its entirety. The intermediary devices SW1 and SW2 on the computed path will transparently forward the RSVP request 48 without stripping away the TLV fields 50-61 and/or rejecting the RSVP request 48. The RSVP request 48 also includes one or more RSVP objects 34 to be processed by the intermediary devices SW1 and SW2 for reserving resources on those intermediary devices SW1 and SW2.

The sub-objects 50-61 are used to signal one or more properties of an RF interface to be reserved. The specific nature of the sub-objects 50-61 is described in the next six paragraphs.

The DownStream (DS) QAM service group ID attribute 50 identifies eligible RF channels by providing a service group ID. The EQAM 15 finds an available RF channel that is in the identified service group and that matches the other DOCSIS parameters indicated in the LSP attributes object 64. This attribute 50 may not be included when the M-CMTS core 10 identifies a specific RF channel to be reserved using the sub-object 61.

The DEPI tunnel mode attribute 51 indicates whether the tunnel to be established will be either a DEPI-MPLS DOCSIS MPEG Packet Transport (D-MPT) tunnel or a DEPI-MPLS DOCSIS Packet Stream Protocol (PSP) mode tunnel. A PSP mode tunnel is priority-oriented, meaning that packets traveling over one session in the priority-oriented tunnel can indicate different priority levels to intermediary devices on the path from different packets transferred over a different session in the priority-oriented tunnel In a PSP mode tunnel, packets exchanged over the tunnel include an MPLS header having an EXPerimental (EXP) field that is used to indicate priority for these packets in a D-MPT mode tunnel, the tunnel may have a priority within the network, however, within the D-MPT mode tunnel, all traffic is sent at the same priority.

The DEPI resource request using Per Hop Basis IDentification (PHB-ID) attribute 52 is used by the M-CMTS core 10 to request one or more flows within the DEPI LSP. For D-MPT mode, the M-CMTS core 10 requests a single flow, whereas for PSP mode, the M-CMTS core 10 requests one or more flows. To request one or more flows, the M-CMTS core 10 signals the PHB-ID for each flow within this sub-object 52. The PHB-IDs will cause the EQAM 15 to return the corresponding flow ID value for each PHB-ID in the RSVP reservation message 49.

The sub-objects 53-61 relate to properties of an eligible QAM channel, or an explicitly requested QAM channel in the case where the DS QAM channel TSID attribute 61 is included. The DS QAM channel DOCSIS SYNChronize (SYNC) attribute 53 is used to indicate whether the RF channel to be reserved is controlled using synchronization. The DS QAM channel frequency attribute 54 is used to specify the downstream frequency of an RF channel to be reserved. The DS QAM Channel Power attribute 55 is used to specify how much transmit power is to be used in the RF channel to be reserved. The DS QAM channel Modulation attribute 56 is used to indicate the type of modulation to be used by the RF channel to be reserved, such as sixty-four constellation QAM or two-hundred and fifty-six constellation QAM. The DS QAM channel J.83 Annex attribute 57 specifies forward error correction settings to be used by the RF channel to be reserved. The DS QAM channel symbol rate attribute 58 specifies the rate of symbols on the wire to be used by the RF channel to be reserved. The DS QAM Channel Interleaver Depth attribute 59 indicates an interleaver depth value to be used by the RF channel to be reserved. The DS QAM channel RF mute attribute 60 indicates whether an RF output of the RF channel to be reserved is muted.

As indicated earlier, the DS QAM channel TSID attribute 61 will indicate a TSID value of a specific one or ones of the RF channels A-D if the M-CMTS core 10 requests a specific channel instead of simply indicating a service group to constrain selection by the EQAM 15. This sub-object 61 may not be included if the sub-object 50 is included. The TSID value of a specific one or ones of the RF channels A-D can also be encoded in the tunnel ID field of an LSP tunnel IPv4 object. RSVP designates the tunnel ID field of an LSP tunnel IPv4 object to be used to indicate a randomly selected value to serve as the tunnel ID.

The EQAM 15 receives the RSVP request 48 and determines whether resources can be reserved thereon for the flow. The EQAM 15 identifies a subset of its QAM channels according to the service group ID indicated in the sub-object 50. Within this service group ID, the EQAM 15 determines whether there are any available QAM channels for the flow that match the other DOCSIS parameters indicated in the LSP attributes object 64. The EQAM 15 can also determine IP interface resources to be reserved according to the RSVP object(s) 34.

If EQAM resources are reserved for the flow, the EQAM 15 allocates and associates a label with the reserved resources. In the illustration, the label Z is associated with the TSID for one of the RF channels A-D. The EQAM responds with an RSVP reservation 49 having a field 65 containing the label Z. The RSVP reservation (RESV message) 49 includes other information such as the DEPI parameters for the reserved RF channel and a flow ID value for each PHB-ID in the sub-object 52 in the LSP attributes object 64. The EQAM 15 also updates its forwarding table 29 with an entry 17 according to the allocated label Z.

The RSVP reservation (RESV message) 49 is sent towards the M-CMTS core 10 via the intermediate devices that individually also allocate a label value and update the MPLS forwarding table with the allocated and received label values. Unlike RSVP reservations as described in RSVP where the bandwidth and affinity criteria are included in the RSVP request and not the RSVP reservation, the RSVP reservation 49 includes some or all of the sub-objects 51-61. At least one of the sub-objects may be updated from the values included in the RSVP request 48 to communicate which outgoing interface was selected by the EQAM 15.

Once the RSVP reservation 49 reaches the M-CMTS core 10, a unidirectional RSVP-TE MPLS tunnel, e.g. DEPI tunnel, is established using the reserved resources between the M-CMTS core 10 and the EQAM 15 via the intermediary devices. The M-CMTS core 10 also updates its forwarding table 28. In the present example, the new entry 16 uniquely associates the selected RF channel using both the IP address X and the TSID for the selected channel as is described in more detail in U.S. patent application Ser. No. 11/776,200 entitled "Transferring DOCSIS Frames Using a Label Switching Network", which is herein incorporated by reference in its entirety. Using both an address for the EQAM 15 and the TSID is preferred since more than EQAM may use a same TSID value. However, it should be apparent that the forwarding table 28 can be configured differently in other examples, in fact in other examples the EQAM 15 does not provide the TSID in addition to the label Z. When the M-CMTS core 10 receives the flow, the M-CMTS core 10 inserts the label Z to the packets of the flow according to the forwarding table 28 and sends the labeled packets over the established DEPI tunnel for forwarding over the reserved RF channel.

If EQAM resources are not reserved for the flow, the EQAM 15 sends back an RSVP notify (PERR message) instead of the RSVP reservation 49. The PERR notify message can include an error code notifying, for example, that a specifically requested RF channel is not available, that the QAM modulation indicated in the object 64 does not match the modulation of the requested RF channel, that the requested QAM channel is down, that the requested service group ID does not match the service group of RF channels on the EQAM 15, etc.

The example described above assumes that a flow travels on one RF channel for ease of explanation. However, channel bonding is a technique used to bond two or more RF channels so that a flow can utilize bandwidth on both RF channels. If bonded channels exist on the same EQAM, then the M-CMTS core 10 can setup a single RSVP-TE MPLS tunnel for more than one RF channel similar to the description above. If the bonded channel exists one more than one EQAM, then the M-CMTS core 10 sets up more than one RSVP-TE MPLS tunnel to claim the RF channels. The flow for the bonded channel is then placed on the plurality of RSVP-TE MPLS tunnels using a channel bonding load-sharing scheme.

Figure 3:
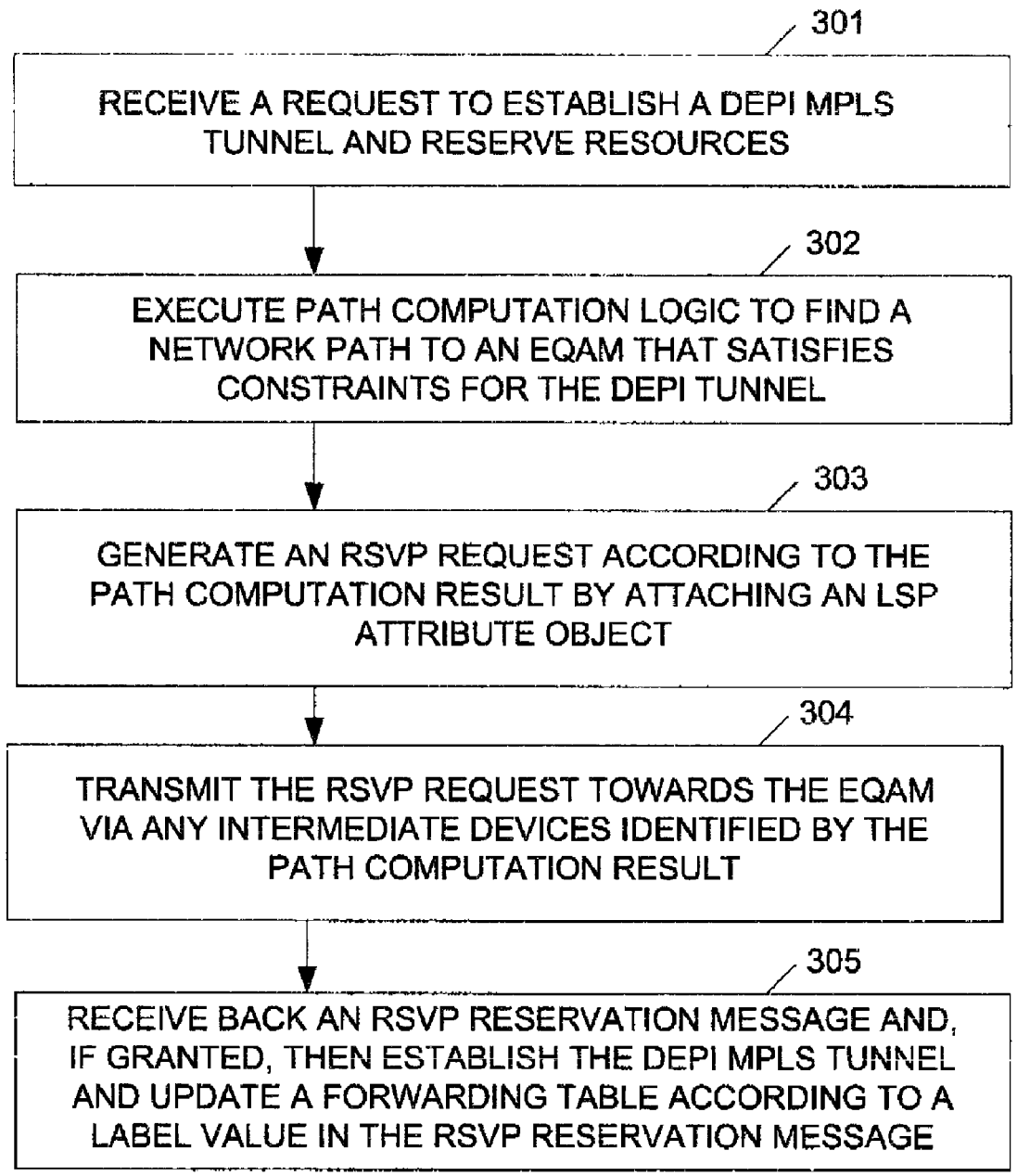
FIG. 3 illustrates how the M-CMTS core shown in FIG. 2 identifies a path to the EQAM and signals DEPI components to reserve the identified path and the EQAM resources.

FIG. 3 illustrates how the M-CMTS core shown in FIG. 2 identifies a path to the EQAM and signals DEPI components to reserve the identified path and the EQAM resources.

In block 301, the M-CMTS core receives a request to establish a DEPI MPLS tunnel and reserve resources. The DEPI tunnel is to be established to the EQAM, and once established, will be used to carry user data downstream from the M-CMTS core to the EQAM for modulation and forwarding to a cable modem.

In block 302, the M-CMTS core executes path computation logic to find a network path to an EQAM that satisfies constraints for the DEPI tunnel. The constraints can include, for example, bandwidth, DEPI mode, DEPI Service Group ID, etc.

In block 303, the M-CMTS core generates an RSVP request according to the path computation result. The generated RSVP request includes an attached LSP attribute object to control resource reservation by the EQAM.

In block 304, the M-CMTS core transmits the RSVP request towards the EQAM via any intermediate devices identified by the path computation result. In block 305, the M-CMTS core receives back an RSVP reservation message and, if granted, then establishes the DEPI MPLS tunnel and updates a forwarding table according to a label value in the RSVP reservation message.

It should be apparent that the order for performing the processes described above is not limited to any ordering shown in the figure. Furthermore, it should be apparent that some or all of the processes can be performed simultaneously.

Figure 4:
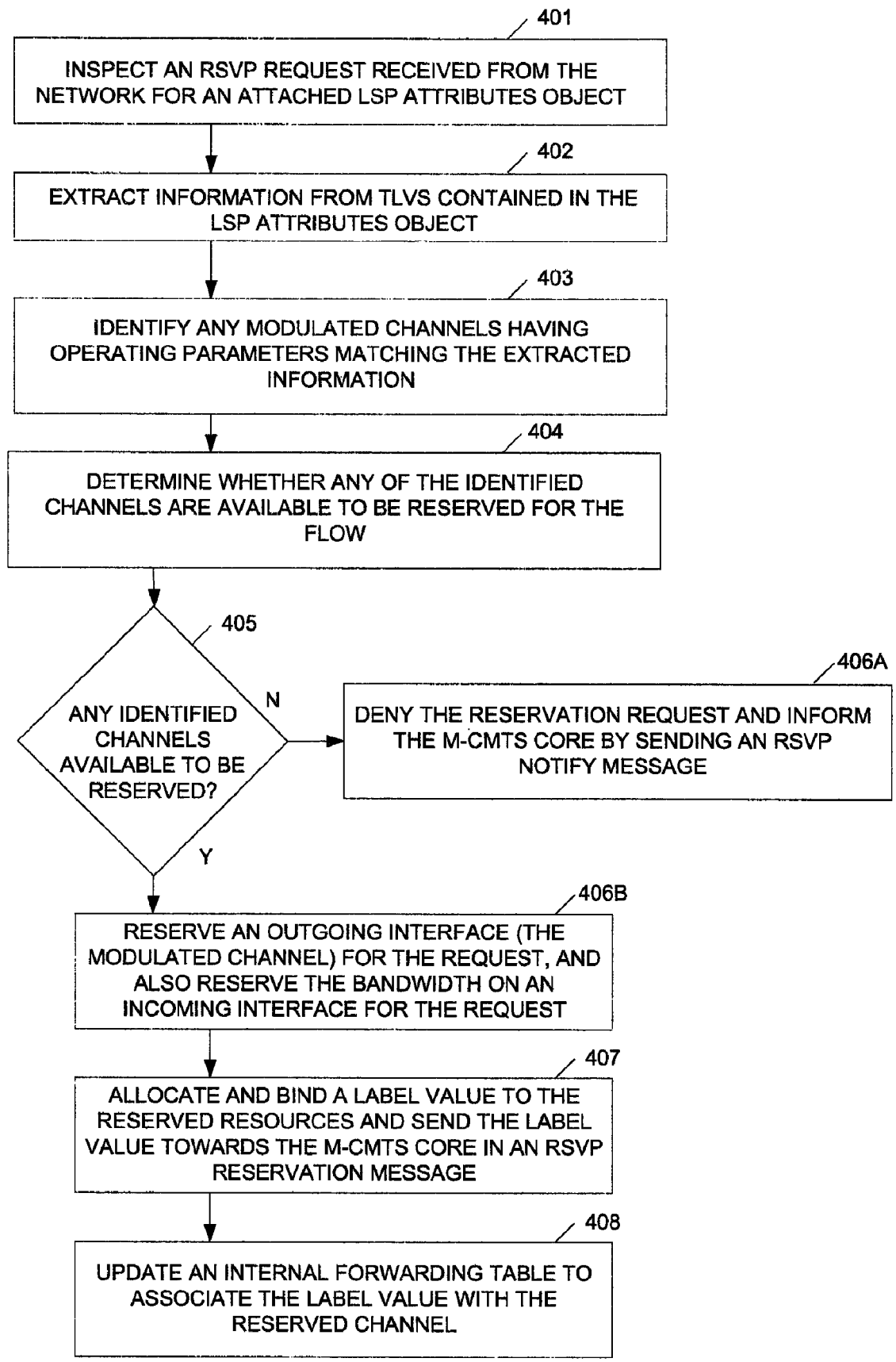
FIG. 4 illustrates how the EQAM shown in FIG. 2 selects an RF channel to forward the traffic from the identified path.

FIG. 4 illustrates how the EQAM shown in FIG. 2 selects an RF channel to forward the traffic from the identified path.

In block 401, the EQAM inspects the RSVP request, received from the network, for an attached LSP Attributes object. In block 402, the EQAM extracts information from TLVs contained in the LSP Attributes object.

In block 403, the EQAM identifies any modulated channels having operating parameters matching the extracted information. The EQAM determines whether any of the identified channels are available to be reserved for the flow in block 404. If there are no identified channels available to be reserved in diamond 405, the EQAM denies the reservation request in block 406A and informs the M-CMTS core by sending an RSVP notify message.

If there is an identified channel available in diamond 405, in block 406B the EQAM reserves an outgoing interface (the available modulated channel) for this request, and also reserves the requested resources, e.g. bandwidth, on the incoming interface for this request. It should be understood that, for the incoming interface, the EQAM reserves resources selected by the M-CMTS core as indicated by the other objects besides the LSP attributes object. For the outgoing interface, the EQAM can select one or more of the RF channels according to the DEPI parameters indicated in the LSP attributes object, and then can reserve this outgoing interface. In block 407, the EQAM allocates and binds a label value to the reserved resources, e.g. modulated channel, and sends the label value towards the M-CMTS core along with other parameters in an RSVP reservation message. The EQAM updates an internal forwarding table according to the label value binding in block 408.

It should be appreciated that the example described above extends RSVP in numerous ways to facilitate resource reservation in a DOCSIS network. For example, in RSVP, only the incoming interface on the tailend of the computed path is reserved by the RSVP request. Put another way, the computed path terminates on the tailend IP address, which must be reachable via the link-state routing protocol. In contrast, the extensions described above cause both the incoming interface and the outgoing interface of the EQAM to be reserved. Put another way, the reserved resources go beyond the tailend IP address to the RF channel that is known to have no IP address.

It should be apparent that the order for performing the processes described above is not limited to any ordering shown in the figure. Furthermore, it should be apparent that some or all of the processes can be performed simultaneously.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use any type of circuitry to execute software instructions, such as dedicated processor systems, micro controllers, programmable logic devices, or microprocessors that perform some or all of the operations.

The system described above can use dedicated processor systems, micro controllers, programmable logic devices, or microprocessors that perform some or all of the operations. Some of the operations described above may be implemented in software and other operations may be implemented in hardware. The term circuitry used herein encompasses numerous types of devices including, but not limited to, dedicated processor systems, micro controllers, programmable logic devices, or microprocessors, regardless of whether these devices operate by executing software or operate independently of software.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A Modular Cable Modem Termination System (M-CMTS) core, comprising:
   circuitry configured to:
   identify a path from the M-CMTS core, over a network, to a remote PHYsical (PHY), wherein the identified path includes an incoming interface on the remote PHY;
   generate a reservation request to control resource reservation on the identified path including resource reservation for the incoming interface;
   attach an extension field to the generated reservation request, wherein the extension field is configured to be transparently forwarded with the generated reservation request by any intermediary devices, and wherein the extension field contains Downstream External Physical Interface (DEPI) information to control which outgoing interface of the remote PHY is reserved for a call flow to be forwarded over the network by the M-CMTS core;
   attach a Radio Frequency (RF) channel parameter to the generated reservation request, wherein the RF channel parameter corresponds to less than all of a plurality of RF channels extending from the remote PHY, and wherein the RF channel parameter is configured to be processed by the remote PHY to constrain RF channel reservation by the remote PHY; and
   transmit, over the network, the generated reservation request having the extension field and the RF channel parameter attached thereto.

2. The M-CMTS core of claim 1, wherein the circuitry is further configured to:
   attach a channel identifier to the extension field, wherein the channel identifier matches a channel identifier of a particular one of the RF channels.

3. The M-CMTS core of claim 1, wherein the circuitry is further configured to:
   identify parameters of intermediary devices operating in the network and parameters of a requested DEPI tunnel; and
   analyze the identified parameters to identify the path.

4. The M-CMTS core of claim 1, wherein the circuitry is further configured to:
   attach a service group identifier to the extension field, wherein the service group identifier constrains outgoing interface selection by the remote PHY to a subset of the RF channels;
   generate and transmit another reservation request to a different remote PHY, wherein both the reservation requests are sent for a same call flow;
   establish unidirectional tunnels to each of the remote PHYs, wherein the unidirectional tunnels are established using resources granted in response to transmitting the reservation requests; and
   distribute the call flow over the unidirectional tunnels.

5. The M-CMTS core of claim 1, wherein the circuitry is further configured to:
   receive back a reservation response;
   extract a label and a channel identifier from the reservation response; and
   add an entry to an internal forwarding table, wherein the entry associates the extracted label with a combination of an address of the PHY and the channel identifier.

6. The M-CMTS core of claim 1, wherein the circuitry is further configured to:
   maintain an internal PHY table according to RF channel descriptors extracted from routing messages forwarded from an adjacent intermediary device, wherein the routing messages are link state routing messages flooded over a domain of the network; and
   identify the path according to information from the PHY table.

7. A PHYsical layer (PHY) modulation device, comprising:

an incoming interface configured to communicate over a network of a Modular Cable Modem Termination System (M-CMTS);

an outgoing interface in communication with the incoming interface, the outgoing interface configured to communicate over a plurality of modulated channels; and circuitry coupled to the interfaces, the circuitry configured to:

inspect a reservation request received over the incoming interface to locate an object attached thereto, wherein the located object contains Downstream External Physical Interface (DEPI) information;

compare parameters of the modulated channels to the DEPI information;

filter the modulated channels according to the comparison; and determine whether any filtered ones of the modulated channels are available to be reserved according to the reservation request.

8. The PHY modulation device of claim 7, wherein the circuitry is further configured to:

allocate a label value and bind the label value to an available one of the modulated channels; and update a forwarding table according to the label value binding to cause a payload of received packets having the label value to be extracted, processed, and then transmitted over the available modulated channel.

9. The PHY modulation device of claim 7, wherein the circuitry is further configured to:

identify a plurality of Radio Frequency (RF) channels parameters within the object, wherein the RF channel parameters include a Down Stream (DS) Quadrature Amplitude Modulation (QAM) channel Data Over Cable Service Interface Specification (DOCSIS) SYNChronize (SYNC) attribute, a DS QAM channel frequency attribute, a DS QAM channel power attribute, a DS QAM channel modulation attribute, a DS QAM channel J.83 Annex attribute, a DS QAM channel symbol rate attribute, a DS QAM channel interleaver depth attribute, and a DS QAM channel RF mute attribute;

identify an RF channel having a configuration matching the identified RF channel parameters; and determine whether the identified RF channel is available to be reserved according to the reservation request.

10. The PHY modulation device of claim 9, wherein the circuitry is further configured to:

generate an RSVP reservation message to grant the reservation request, wherein the generated reservation message includes at least one updated RF channel parameter to indicate a subset of the modulated channels reserved by the PHY modulation device.

11. A Modular Cable Modem Termination System (M-CMTS) core, comprising:

circuitry configured to:

identify a path from the M-CMTS core, over a network, to a remote PHYsical (PHY);

generate a reservation request having a plurality of objects, wherein a first subset of the plurality of objects is configured to control resource reservation by intermediary devices operating on the network, and wherein a second different subset of the plurality of objects is configured to be transparently forwarded by the intermediary devices and configured to control reservation of a Radio Frequency (RF) channel by the remote PHY;

transmit the reservation request to cause the intermediary devices to process the first subset of objects and forward, to the remote PHY, the reservation request having the second subset of objects attached thereto; and insert RF channel parameters in the second subset, wherein the RF channel parameters correspond to less than all of a plurality of RF channels extending from the remote PHY, and wherein the RF channel parameters are configured to be processed by the PHY to constrain RF channel reservation by the PHY.

12. The M-CMTS core of claim 11, wherein the circuitry is further configured to:

insert an RF channel identifier in the second subset, wherein the RF channel identifier is at least one selected from the group including a TSID for an RF channel and a service group ID.

13. The M-CMTS core of claim 12, wherein the first subset of objects are configured to control resource reservation on an incoming interface of the PHY and the second subset of objects are configured to control resource reservation on an outgoing interface of the PHY.

14. The M-CMTS core of claim 13, wherein the RF channel parameters are inserted into a Label Switched Protocol (LSP) Attributes object of an RSVP reservation request.

15. The M-CMTS core of claim 14, wherein the circuitry is further configured to:

receive back a reservation response from the PHY;

extract a label and a channel identifier from the reservation response; and add an entry to an internal forwarding table, wherein the entry associates the label with a combination of an address of the PHY and the channel identifier.

16. The M-CMTS core of claim 14, wherein the circuitry is further configured to:

maintain an internal PHY table according to modulated channel descriptors extracted from routing messages forwarded from an adjacent intermediary device, wherein the routing messages are link state routing messages flooded over a domain of the network; and identify the path according to information from the PHY table.

17. The M-CMTS core of claim 14, wherein the second subset of objects identifies parameters of eligible RF channels, and wherein the parameters include:

a Down Stream (DS) Quadrature Amplitude Modulation (QAM) channel Data Over Cable Service Interface Specification (DOCSIS) SYNChronize (SYNC) attribute, a DS QAM channel frequency attribute, a DS QAM channel power attribute, a DS QAM channel modulation attribute, a DS QAM channel J.83 Annex attribute, a DS QAM channel symbol rate attribute, a DS QAM channel interleaver depth attribute, and a DS QAM channel RF mute attribute.

18. The M-CMTS core of claim 17, wherein the parameters further include a DS QAM channel TSID attribute identifying a particular one of the RF channels.

19. The M-CMTS core of claim 18, wherein the first subset of objects includes a Label Switched Path (LSP) tunnel IPv4 object, and wherein the DS QAM channel TSID value is encoded in the tunnel ID field of the LSP tunnel IPv4 object.

20. The M-CMTS core of claim 14, wherein the second subset of objects identifies a service group ID.

* * * * *